Aug. 24, 1937.    C. L. STRAITH    2,091,057

SAFETY DEVICE FOR AUTOMOBILES

Original Filed April 1, 1935

INVENTOR.
Claire L. Straith.
BY
Harness, Dickey, Pierce & Hann.
ATTORNEYS.

Patented Aug. 24, 1937

2,091,057

UNITED STATES PATENT OFFICE 2,091,057

SAFETY DEVICE FOR AUTOMOBILES

Claire L. Straith, Detroit, Mich.

Original application April 1, 1935, Serial No. 14,116. Divided and this application June 25, 1936, Serial No. 87,169

9 Claims. (Cl. 280—150)

The present invention relates to protective devices for use in vehicle interiors, and more particularly to a protective device for use in connection with the dash or instrument panel of an automobile. The present application is a division of application Serial No. 14,116, filed April 1, 1935, for Safety device for automobiles.

Objects of the present invention are to provide, in combination with an automobile dash or instrument panel, a cushioning member extending partially across the panel and having an outer or exposed surface flush with the remaining surface of the instrument panel; to provide such a combination embodying a dash or instrument panel which is recessed or depressed throughout a portion of its length to receive the cushioning member, the recess being of such depth in relation to the thickness of the cushioning member that the cushioning member surface lies flush with the surface of the remaining parts of the panel; to provide such a structure in which the instrument panel is divided into a lower instrument portion and an upper decorative portion, the protective cushioning member being associated with the decorative portion, leaving the instrument portion free for the mounting of the usual instruments or the like; and to provide such a construction in which the decorative portion, carrying the cushioning member, is resiliently and pivotally connected to the instrument portion.

With the above and other objects in view which appear in the following description and in the appended claims, preferred but illustrative embodiments of the present invention are shown in the accompanying drawing, throughout the several views of which corresponding reference characters are used to designate corresponding parts and in which:

The advent of relatively high vehicle operating speeds has created a need for improved safety devices to protect the occupants of automobiles in the event of abrupt stops. Examples of such improvements include the use of safety glass for the windshield and other windows of enclosed cars. Accident statistics, however, show that a substantial proportion of injuries resulting to automobile passengers involve crushing of the facial bones. Accidents of this character occur most frequently to occupants of the guest passenger seat, and are occasioned by the sudden violent forward movement imparted to such passengers in the event of collisions. In accordance with current automobile body designs, the dash or instrument panels are positioned somewhat above the level of the seats, and it is found that the majority of the above mentioned facial injuries are caused by striking these parts.

In accordance with the present invention, therefore, compressible or cushioning members are arranged to be secured to the instrument panel, either permanently, or detachably. Preferably, though not necessarily, the cushioning members are positioned at the upper or decorative part of the instrument panel, thus leaving the lower parts available for the mounting of the usual instruments. The cushioning members may be formed of various materials, but preferably are formed of a readily compressible member, such as sponge rubber, which is sufficiently flexible to lend itself to any desired curvature.

As described in more detail hereinafter, in accordance with one embodiment of the present invention, the cushioning effect of the above described member may be supplemented by making one part of the instrument panel relatively movable with respect to the associated lower portion. As illustrated, this is accomplished by pivotally connecting two sections of the instrument panel, and permitting limited movement of one part subject to the force of a retaining spring or springs. In accordance with this embodiment, the initial impact is absorbed by the rubber cushioning member and further forward movement of the passenger is absorbed by the supporting springs.

As will be apparent from a further reading of the specification, the cushioning member may extend either partially or entirely across the instrument panel. It has been found that the steering wheel acts as a protection to the driver of an automobile, so that the additional cushioning means of the present invention is particularly desirable in connection with the portions of the instrument panel not so protected. Accordingly, it is considered desirable that the cushioning surface be flush with the surface of the remaining portions of the dash, thus avoiding abrupt changes in contour.

Figure 1:
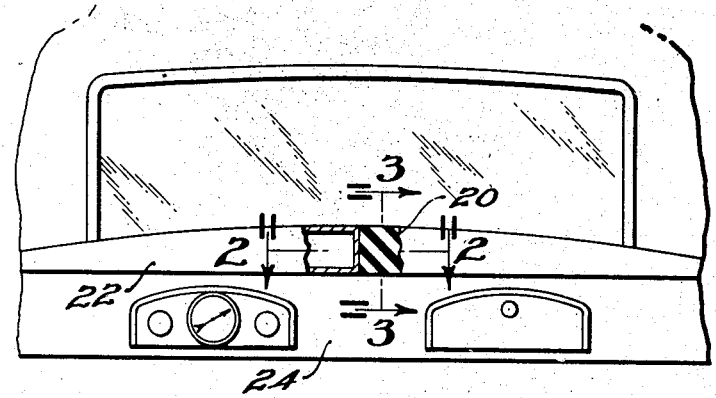
Figure 1 is a view in elevation, illustrating the application of the cushioning member to the decorative portion of an automobile instrument panel.
Figure 2:
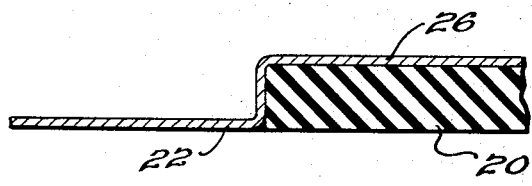
Fig. 2 is a fragmentary view in section, taken along the line 2—2 of Fig. 1.
Figure 3:
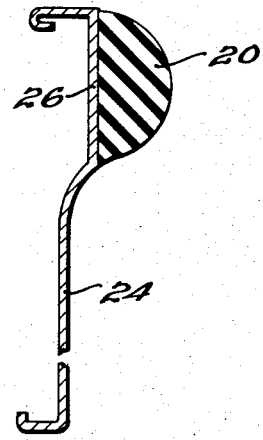
Fig. 3 is a fragmentary view in vertical section, taken along the line 3—3 of Fig. 1.
Figure 4:
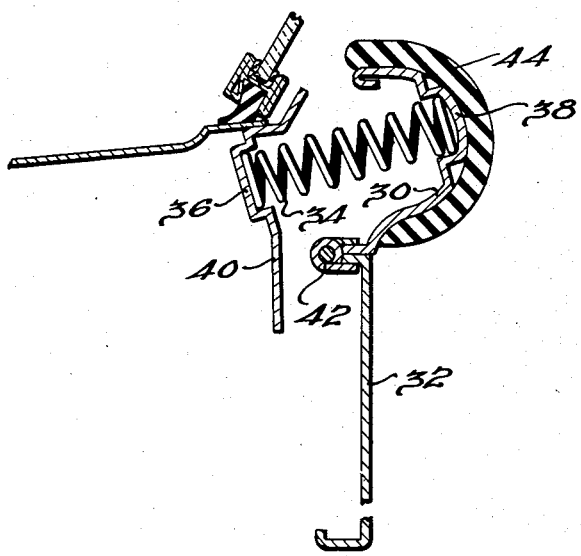
Fig. 4 is a view in vertical transverse section of a modified embodiment of the present invention in which the decorative portion of the panel is resiliently and pivotally connected to the instrument portion thereof.

In the modification illustrated in Figs. 1, 2, and 3, a compressible member 20 is permanently associated with the upper or decorative portion 22 of a vehicle instrument panel, the lower or instrument portion 24 of which may accommodate the usual instruments or the like. This permanent association may be provided in a variety of ways, for example, by any well known vulcanizing process.

As is clearly shown in Figs. 2 and 3, the instrument panel is provided with a depressed portion 26 extending from one end thereof to a point adjacent midway between the ends, within which the member 20 is fitted, the flat inner face of member 20 engaging the correspondingly formed base of recess 26. The outer face of member 20, the curvature of which preferably corresponds to the curvature of the remaining parts of portion 22, lies flush with and forms a continuation thereof.

In the modification illustrated in Fig. 9, the part of the cowl or instrument panel to which the pad is secured is divided into two sections 30 and 32. The upper section 30 is flexibly mounted for movement against the force of a spring 34, the ends of which are seated in recesses 36 and 38 formed in panel 40 and section 30, respectively. Sections 30 and 32 are hingedly connected together by a pin 42. In accordance with this modification, the resilient member 44 softens the initial impact of the passenger and further forward movement of the latter is absorbed by spring 34. In accordance with the arrangement of Figs. 1, 2, and 3, the panel portion 30, to which member 44 is permanently secured, is preferably depressed or recessed so that the outer surface of member 44 lies flush with and acts as a continuation of the remainder of the decorative portion of the instrument panel.

From the foregoing, it will be seen that the present invention provides effective protection for the occupants of an automobile against injuries resulting from sudden forward movement. Although specific embodiments have been described, it is evident that various modifications may be made without departing from the spirit and scope of the present invention. The described embodiments, accordingly, are to be considered in an illustrative, and not in a limiting, sense.

What I claim is:

1. The combination with a vehicle instrument panel, of a cushioning member recessed into and extending across only a part of the surface of said panel, and means securing said member on said panel with the exposed surface of said member substantially flush with the surface of the remainder of said panel.

2. The combination in a vehicle instrument panel, of a lower instrument portion, an upper decorative portion, means forming a pivotal connection between said decorative portion and said instrument portion, and resilient means urging said decorative portion to a predetermined pivotal position relative to said instrument portion.

3. The combination with a vehicle instrument panel having instrument and decorative portions, of a cushioning member recessed into and extending across a part only of the surface of said decorative portion, and means securing said member thereon with the exposed surface of said member substantially flush with the surface of the remainder of said portion.

4. The combination with a vehicle instrument panel having instrument and decorative portions, of a cushioning member having an exposed surface shaped to conform to the contour of said decorative portion recessed into and extending across a part only of the surface of said decorative portion, and means securing said member on said panel with said exposed surface of said member substantially flush with and forming a continuation of the surface of the remainder of said portion.

5. The combination with a vehicle instrument panel having instrument and decorative portions, of a sponge rubber cushioning member extending across a part of the surface of said decorative portion, and means securing said member thereon with the exposed surface of said member substantially flush with the surface of the remainder of said decorative portion.

6. A vehicle instrument panel comprising, in combination, a portion at one side of said panel adapted to accommodate instruments, and a resilient cushioning member secured to the other side of said panel with the exposed cushion surface substantially flush with the surface of the said panel portion.

7. The combination with a vehicle instrument panel having instrument and decorative portions, of means resiliently supporting a part of said decorative portion extending from one end of said panel to a point adjacent the middle of said panel for pivotal movement relative to said instrument portion and in recessed relation to the remainder of said decorative portion, a cushioning member extending across said part, and means securing said cushioning member to said part with the exposed surface of said cushioning member substantially flush with the surface of said remainder.

8. The combination in an impact protective instrument panel for a vehicle, of a lower instrument portion, a decorative portion positioned above and in engaging relation to said instrument portion, a supporting connection between said portions constructed to permit said decorative portion to be moved forwardly of the vehicle relative to said instrument portion in the event of impact thereon, and resilient means urging said decorative portion rearwardly of the vehicle to a predetermined position relative to said instrument portion.

9. The combination with a vehicle instrument panel, of a cushioning member extending across only a part of the surface of said panel and secured thereon with a marginal edge of the exposed cushion surface substantially flush with and merging into the adjacent exposed surface of said portion, so that said cushion forms a continuation of said panel surface.

CLAIRE L. STRAITH.